US011352006B2

(12) United States Patent
Natsumi et al.

(10) Patent No.: US 11,352,006 B2
(45) Date of Patent: Jun. 7, 2022

(54) TRAVEL CONTROL DEVICE, VEHICLE, AND TRAVEL CONTROL METHOD

(71) Applicant: Isuzu Motors Limited, Tokyo (JP)

(72) Inventors: Kouki Natsumi, Fujisawa (JP); Masaichi Takahashi, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 0 days.

(21) Appl. No.: 16/761,798

(22) PCT Filed: Nov. 6, 2018

(86) PCT No.: PCT/JP2018/041123
§ 371 (c)(1),
(2) Date: May 6, 2020

(87) PCT Pub. No.: WO2019/093302
PCT Pub. Date: May 16, 2019

(65) Prior Publication Data
US 2020/0317195 A1 Oct. 8, 2020

(30) Foreign Application Priority Data
Nov. 8, 2017 (JP) .............................. JP2017-215528

(51) Int. Cl.
*B60W 30/165* (2020.01)

(52) U.S. Cl.
CPC .................. *B60W 30/165* (2013.01)

(58) Field of Classification Search
CPC ......... B60W 30/165; B60W 2554/804; B60W 2720/106; B60W 2554/4042; B60W 30/16; B60K 2310/268; B60K 2310/248
See application file for complete search history.

(56) References Cited

U.S. PATENT DOCUMENTS 6,269,298 B1 7/2001 Seto
2002/0018003 A1 2/2002 Andreas et al.
(Continued)

FOREIGN PATENT DOCUMENTS

DE 19963224 6/2001
DE 10006403 8/2001
(Continued)

OTHER PUBLICATIONS

English_Translation_JP2003127701A (Year: 2003).*
(Continued)

*Primary Examiner* — Peter D Nolan
*Assistant Examiner* — Ashley L Redhead, Jr.

(57) ABSTRACT

A travel control device whereby wasted energy consumption can be suppressed. The travel control device (100) has: a leading vehicle detection unit (110) that, once a leading vehicle that has been followed at no more than a set vehicle speed has gone, determines whether or not a new leading vehicle has been detected within a prescribed time; a speed determination unit (120) that, if a new leading vehicle has been detected, determines whether or not the speed difference between the speed of a host vehicle and the speed of the leading vehicle is within a set range having zero as the reference therefor; and a travel control unit (130) that, if the speed difference is within the set range, controls the host vehicle so as to prohibit acceleration for reducing the distance between the host vehicle and the new leading vehicle to a set inter-vehicle distance.

8 Claims, 3 Drawing Sheets

(56) References Cited

U.S. PATENT DOCUMENTS

| | | | | |
|---|---|---|---|---|
| 2002/0069010 A1* | 6/2002 | Nishira | ............ | B60K 31/0008 |
| | | | | 701/96 |
| 2002/0165657 A1 | 11/2002 | Winner et al. | | |
| 2017/0080941 A1 | 3/2017 | Ono et al. | | |
| 2018/0015923 A1* | 1/2018 | Kurumisawa | ....... | B60W 30/165 |
| 2018/0188745 A1* | 7/2018 | Pilkington | ........... | G05D 1/0276 |
| 2018/0251845 A1* | 9/2018 | Sparks | ................ | C12Q 1/6883 |
| 2020/0086869 A1* | 3/2020 | Oguro | ............... | B60W 30/0956 |
| 2021/0316728 A1* | 10/2021 | Won | .................... | B60W 30/162 |

FOREIGN PATENT DOCUMENTS

| | | | | |
|---|---|---|---|---|
| DE | 10018557 | | 10/2001 | |
| DE | 102011078776 | | 1/2013 | |
| DE | 102015202272 A1 * | | 8/2015 | ........... B60W 10/18 |
| JP | 10-194008 | | 7/1998 | |
| JP | 11-321378 | | 11/1999 | |
| JP | 2000-038048 | | 2/2000 | |
| JP | 2002-178787 | | 6/2002 | |
| JP | 2003127701 A * | | 5/2003 | |
| JP | 2005-138762 | | 6/2005 | |
| JP | 2005-263099 | | 9/2005 | |
| JP | 2007-153080 | | 6/2007 | |
| JP | 2007153080 A * | | 6/2007 | |
| JP | 2009-166824 | | 7/2009 | |
| JP | 2017-056857 | | 3/2017 | |
| JP | 2018-039318 | | 3/2018 | |
| WO | WO 2019/093302 A1 | | 5/2019 | |

OTHER PUBLICATIONS

English_Translation_JP2007153080A (Year: 2007).*
English_Translation_DE102015202272A1 (Year: 2015).*
International Search Report and the Written Opinion dated Feb. 12, 2019 From the International Searching Authority Re. Application No. PCT/JP2018/041123 and Its Translation of Search Report Into English. (10 Pages).

* cited by examiner

TRAVEL CONTROL DEVICE, VEHICLE, AND TRAVEL CONTROL METHOD

TECHNICAL FIELD

The present disclosure relates to a travel control device, a vehicle, and a travel control method.

BACKGROUND ART

There is known, as a drive assist function, adaptive cruise control (ACC) for driving a vehicle at a constant speed following a leading vehicle while keeping an inter-vehicle distance (see, Patent Literature (hereinafter, abbreviated as PTL) 1, for example).

CITATION LIST

Patent Literature

PTL 1
Japanese Patent Application Laid-Open No. 2017-056857

SUMMARY OF INVENTION

Technical Problem

When a leading vehicle being followed by a vehicle has disappeared due to, for example, lane change, the known ACC performs control to accelerate the vehicle to reduce an inter-vehicle distance between the vehicle and a newly detected leading vehicle. However, the acceleration causes a problem of wasteful energy (fuel) consumption.

An object of the present disclosure is to provide a travel control device, a vehicle, and a travel control method capable of suppressing wasteful energy consumption.

Solution to Problem

A travel control device according to one aspect of the present disclosure is a device that executes adaptive cruise control (ACC) for allowing a host vehicle to follow a leading vehicle and travel at a constant speed while keeping a preset inter-vehicle distance, the travel control device including: a leading vehicle detection section that, after the leading vehicle being followed at a speed equal to or lower than a preset vehicle speed has disappeared, determines whether a new leading vehicle has been detected in a predetermined time; a speed determination section that, when the new leading vehicle has been detected, determines whether a speed difference between a speed of the host vehicle and a speed of the new leading vehicle is within a set range based on zero; and a travel control section that, when the speed difference is within the set range, controls the host vehicle to disable acceleration for reducing an inter-vehicle distance between the host vehicle and the new leading vehicle to the preset inter-vehicle distance.

A vehicle according to one aspect of the present disclosure includes the travel control device according to the one aspect of the present disclosure described above.

A travel control method according to one aspect of the present disclosure is a method that executes adaptive cruise control (ACC) for allowing a host vehicle to follow a leading vehicle and travel at a constant speed while keeping a preset inter-vehicle distance, the travel control method including: determining, after the leading vehicle being followed at a speed equal to or lower than a preset vehicle speed has disappeared, whether a new leading vehicle has been detected in a predetermined time; determining, when the new leading vehicle has been detected, whether a speed difference between a speed of the host vehicle and a speed of the new leading vehicle is within a set range based on zero; and controlling, when the speed difference is within the set range, the host vehicle to disable acceleration for reducing an inter-vehicle distance between the host vehicle and the new leading vehicle to the preset inter-vehicle distance.

Advantageous Effects of Invention

The present disclosure can suppress wasteful energy consumption.

DESCRIPTION OF EMBODIMENTS

An embodiment of the present disclosure is described in detail with reference to the drawings.

Figure 1:
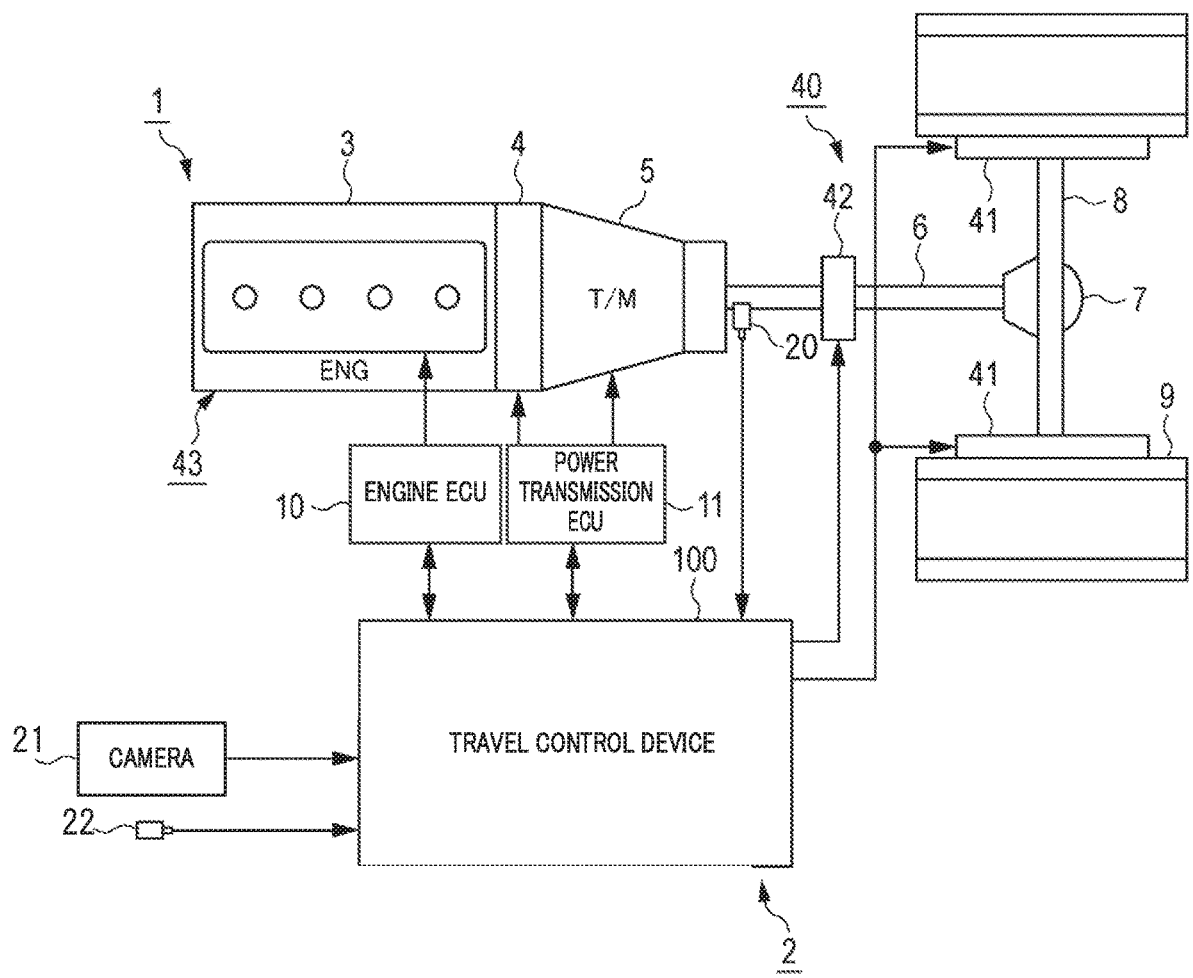
FIG. 1 is a block diagram illustrating an example of the configuration of a vehicle including a travel control device according to an embodiment of the present disclosure.

First, the configuration of vehicle 1 including travel control device 100 according to this embodiment is described. FIG. 1 is a block diagram illustrating an example of the configuration of vehicle 1 including travel control device 100 according to this embodiment. Here, the illustration and description are given focusing on parts related to travel control device 100.

An example of vehicle 1 (an example of the host vehicle) illustrated in FIG. 1 is a heavy duty vehicle, for example, equipped with an in-line six-cylinder diesel engine, such as a truck.

As illustrated in FIG. 1, as a driving system for driving vehicle 1, vehicle 1 includes engine 3, clutch 4, transmission 5, propeller shaft 6, differential gear 7, drive shaft 8, and wheels 9.

The power of engine 3 is transmitted to transmission 5 via clutch 4. The power transmitted to transmission 5 is then transmitted to wheels 9 via propeller shaft 6, differential gear 7, and drive shaft 8. Thus, the power of engine 3 is transmitted to wheels 9 to drive vehicle 1.

In this embodiment, an example in which vehicle 1 includes engine 3 as a power source is described. The power source is not restrictive thereto. For example, vehicle 1 may include both of engine 3 and a motor as its power source.

Vehicle 1 further includes, as a detection section, vehicle speed sensor 20, camera 21, and speed/distance detection sensor 22.

Vehicle speed sensor 20 detects the speed of vehicle 1 and outputs information indicating the detected speed (hereinafter referred to as host-vehicle speed information) to travel control device 100.

Camera 21 captures a forward image of vehicle 1 and outputs the captured image (hereinafter referred to as "forward image") to travel control device 100.

Speed/distance detection sensor 22 detects the speed of a leading vehicle and the inter-vehicle distance between vehicle 1 and the leading vehicle and outputs information indicating the detected speed (hereinafter referred to as "leading-vehicle speed information") and information indicating the detected inter-vehicle distance (hereinafter referred to as "inter-vehicle distance information") to travel control device 100. The leading vehicle is a vehicle travelling in front of vehicle 1 in the lane in which vehicle 1 is travelling.

Vehicle 1 includes braking device 40 as a braking system for stopping the vehicle.

For example, braking device 40 includes foot brake 41 that applies resistance to wheels 9, retarder 42 that applies resistance to propeller shaft 6, and auxiliary brake 43, such as an exhaust brake, that puts a load on engine 3.

Vehicle 1 further includes automated traveling device 2 as a control system for controlling travelling of vehicle 1.

Automated traveling device 2 is an device that executes adaptive cruise control (ACC) by controlling the output of engine 3, engagement and disengagement of clutch 4, and shift of transmission 5.

For example, automated traveling device 2 includes engine electrical control unit (ECU) 10, power transmission ECU 11, and travel control device 100.

Engine ECU 10, power transmission ECU 11, and travel control device 100 are connected to one another via an in-vehicle network to transmit and receive necessary data and control signals to and from one another.

Engine ECU 10 controls the output of engine 3.

Power transmission ECU 11 controls the engagement and disengagement of clutch 4 and shift of transmission 5.

When an instruction to execute ACC is given, for example, from the occupant of vehicle 1, travel control device 100 executes ACC for allowing vehicle 1 to follow the leading vehicle and travel at a constant speed while keeping a preset inter-vehicle distance (hereinafter referred to as "set inter-vehicle distance") based on host-vehicle speed information, a forward image, leading-vehicle speed information, and inter-vehicle distance information. When executing ACC, travel control device 100 controls the components of vehicle 1 (for example, engine ECU 10, power transmission ECU 11, foot brake 41, and retarder 42).

For example, when a leading vehicle is detected, and the speed of the leading vehicle is equal to or less than a preset vehicle speed (hereinafter referred to as "set vehicle speed"), travel control device 100 controls vehicle 1 to follow the leading vehicle and travel while keeping the set inter-vehicle distance. The set vehicle speed is set by the occupant of vehicle 1, for example.

For example, when no leading vehicle is detected or when a leading vehicle is detected and the speed of the leading vehicle exceeds the set vehicle speed, travel control device 100 controls vehicle 1 to travel at the set vehicle speed.

The above control is common ACC. In addition to the control, travel control device 100 performs characteristic control in the case where, after the leading vehicle being followed disappears due to lane change or the like, a new leading vehicle is detected. This characteristic control is described below with reference to FIG. 2 and FIG. 3.

The configuration of vehicle 1 has been described above.

Figure 2:
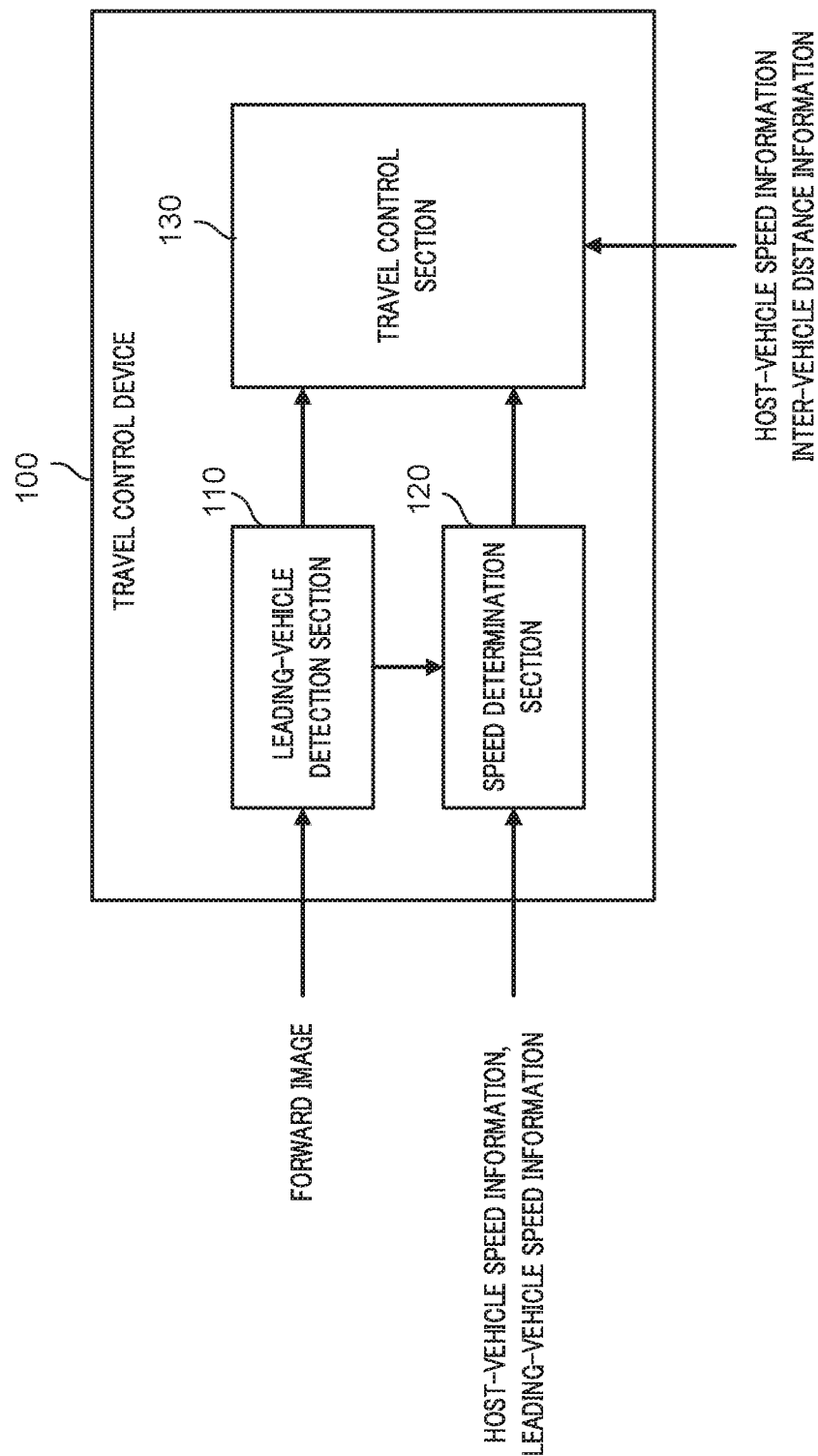
FIG. 2 is a block diagram illustrating an example of the configuration of a travel control device according to an embodiment of the present disclosure.

Next, the configuration of travel control device 100 according to this embodiment is described. FIG. 2 is a block diagram illustrating an example of the configuration of travel control device 100.

Travel control device 100 illustrated in FIG. 2 includes, for example, a central processing unit (CPU), a storage medium that stores a control program, such as a read only memory (ROM), a work memory, such as a random access memory (RAM), and a communication circuit (all of which are not illustrated). The functions of the components illustrated in FIG. 2 are implemented by the CPU executing the control program.

As illustrated in FIG. 2, travel control device 100 includes leading-vehicle detection section 110, speed determination section 120, and travel control section 130.

Leading-vehicle detection section 110 determines whether a leading vehicle is present based on whether a forward image received from camera 21 includes a leading vehicle.

For example, when leading-vehicle detection section 110 detects that the leading vehicle being followed has disappeared and thereafter detects a new leading vehicle in a predetermined time, leading-vehicle detection section 110 outputs first detection result information indicating the detection result to speed determination section 120.

For example, when leading-vehicle detection section 110 detects that the leading vehicle being followed has disappeared and thereafter detects no new leading vehicle in a predetermined time, leading-vehicle detection section 110 outputs second detection result information indicating the detection result to travel control section 130.

When speed determination section 120 receives the first detection result information from leading-vehicle detection section 110, speed determination section 120 calculates the difference (hereinafter referred to as "speed difference") between the speed of vehicle 1 and the speed of the leading vehicle based on host-vehicle speed information received from vehicle speed sensor 20 and leading-vehicle speed information received from speed/distance detection sensor 22 and determines whether the speed difference is within a predetermined range (hereinafter referred to as "set range"). The set range is within ±A (A is a predetermined value) from zero.

When the speed difference is within the set range (for example, when the speed of vehicle 1 and the speed of the leading vehicle are equal, or when the speed of vehicle 1 is a little higher or lower than the speed of the leading vehicle), speed determination section 120 outputs first determination result information indicating the determination result to travel control section 130.

In contrast, when the speed difference is not within the set range, speed determination section 120 determines whether the speed of vehicle 1 is faster than the speed of the leading vehicle.

When the speed of vehicle 1 is faster than the speed of the leading vehicle, speed determination section 120 outputs second determination result information indicating the determination result to travel control section 130.

In contrast, when the speed of the leading vehicle is faster than the speed of vehicle 1, speed determination section 120 determines whether the speed of the leading vehicle is equal to or lower than the set vehicle speed.

When the speed of the leading vehicle is equal to or lower than the set vehicle speed, speed determination section 120 outputs third determination result information indicating the determination result to travel control section 130.

In contrast, when the speed of the leading vehicle exceeds the set vehicle speed, speed determination section 120 outputs fourth determination result information indicating the determination result to travel control section 130.

Travel control section 130 performs predetermined control according to which of second detection result information, first determination result information, second determination result information, third determination result information, and fourth determination result information travel control section 130 has received.

For example, when travel control section 130 has received first determination result information or second determination result information, travel control section 130 controls vehicle 1 to disable acceleration (acceleration for reducing the inter-vehicle distance between vehicle 1 and the newly detected leading vehicle to the set inter-vehicle distance), which is performed in the conventional ACC. In other words, travel control section 130 controls vehicle 1 to travel while keeping the speed when following the disappeared leading vehicle.

For example, when travel control section 130 has received third determination result information, travel control section 130 applies acceleration to reduce the inter-vehicle distance between vehicle 1 and the leading vehicle to the set inter-vehicle distance. This acceleration is limited to the set vehicle speed at the maximum. Thereafter, travel control section 130 performs a braking operation based on the inter-vehicle distance information received from speed/distance detection sensor 22, and when the inter-vehicle distance reaches the set inter-vehicle distance, travel control section 130 controls vehicle 1 to follow the newly detected leading vehicle and travel while keeping the set inter-vehicle distance.

For example, when travel control section 130 has received second detection result information or fourth determination result information, travel control section 130 performs acceleration. This acceleration is limited to the set vehicle speed at the maximum. Thereafter, when the speed of vehicle 1 indicated by the host-vehicle speed information has reached the set vehicle speed, travel control section 130 controls vehicle 1 to travel while keeping the set vehicle speed.

The configuration of travel control device 100 has been described above.

Figure 3:
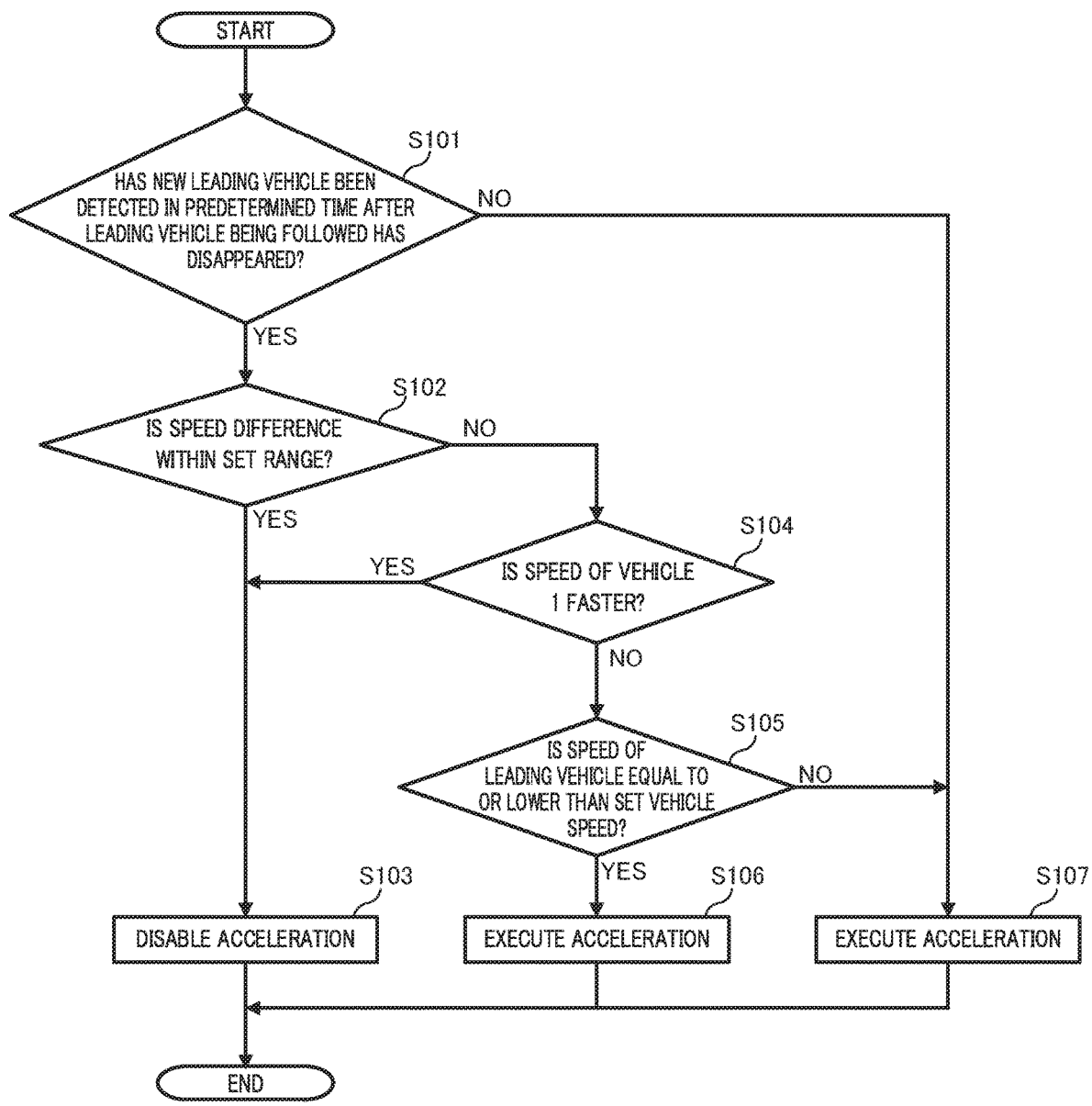
FIG. 3 is a flowchart illustrating an example of the operation of the travel control device according to an embodiment of the present disclosure.

Next, an example of the operation of travel control device 100 is described. FIG. 3 is a flowchart illustrating an example of the operation of travel control device 100. The processing procedure illustrated in FIG. 3 is executed when vehicle 1 is following the leading vehicle at a speed equal to or lower than the set vehicle speed.

First, leading-vehicle detection section 110 determines, based on a forward image from camera 21, whether a new leading vehicle has been detected within a predetermined time after the leading vehicle being followed has disappeared (step S101).

When no new leading vehicle has been detected after leading-vehicle detection section 110 detects that the leading vehicle being followed has disappeared (step S101: NO), leading-vehicle detection section 110 outputs second detection result information to travel control section 130. Thereafter, the processing procedure proceeds to step S107 described below.

In contrast, when a new leading vehicle has been detected within a predetermined time after leading-vehicle detection section 110 detects that the leading vehicle being followed has disappeared (step S101: YES), leading-vehicle detection section 110 outputs first detection result information to speed determination section 120. Thereafter, the processing procedure proceeds to step S102 described below.

When speed determination section 120 receives the first detection result information, speed determination section 120 calculates the speed difference based on the host-vehicle speed information from vehicle speed sensor 20 and the leading-vehicle speed information from speed/distance detection sensor 22 and determines whether the speed difference is within the set range (step S102).

When the speed difference is within the set range (step S102: YES), speed determination section 120 outputs first determination result information to travel control section 130.

When travel control section 130 receives the first determination result information, travel control section 130 controls vehicle 1 to disable acceleration for reducing the inter-vehicle distance between vehicle 1 and the newly detected leading vehicle to the set inter-vehicle distance (step S103).

In contrast, when the speed difference is not within the set range (step S102: NO), speed determination section 120 determines whether the speed of vehicle 1 is faster than the speed of the leading vehicle (step S104).

When the speed of vehicle 1 is faster than the speed of the leading vehicle (step S104: YES), speed determination section 120 outputs second determination result information to travel control section 130.

When travel control section 130 receives the second determination result information, travel control section 130 controls vehicle 1 to disable acceleration for reducing the inter-vehicle distance between vehicle 1 and the newly detected leading vehicle (step S103).

In contrast, when the speed of the leading vehicle is faster than the speed of vehicle 1 (step S104: NO), speed determination section 120 determines whether the speed of the leading vehicle is equal to or lower than the set vehicle speed (step S105).

When the speed of the leading vehicle is equal to or lower than the set vehicle speed (step S105: YES), speed determination section 120 outputs third determination result information to travel control section 130.

When travel control section 130 receives the third determination result information, travel control section 130 executes acceleration for reducing the inter-vehicle distance between vehicle 1 and the leading vehicle to the set inter-vehicle distance (step S106). This acceleration is limited to the set vehicle speed at the maximum. Thereafter, when the inter-vehicle distance indicated by the inter-vehicle distance information reaches the set inter-vehicle distance, travel control section 130 controls vehicle 1 to follow the leading vehicle and travel while keeping the set inter-vehicle distance.

In contrast, when the speed of the leading vehicle exceeds the set vehicle speed (step S105: NO), speed determination section 120 outputs fourth determination result information to travel control section 130.

When travel control section 130 receives the second detection result information or the fourth determination result information, travel control section 130 executes acceleration (step S107). This acceleration is limited to the set vehicle speed at the maximum. Thereafter, when the speed of vehicle 1 indicated by the host-vehicle speed information reaches the set vehicle speed, travel control section 130 controls vehicle 1 to travel while keeping the set vehicle speed.

The operation of travel control device 100 has been described above.

[Advantageous Effects of Embodiment]

When a leading vehicle being followed by a vehicle has disappeared due to lane change or the like, conventional ACC performs acceleration to reduce the inter-vehicle distance between the vehicle and a newly detected leading vehicle to the set inter-vehicle distance. However, the acceleration causes a problem of wasteful fuel consumption.

Accordingly, when the speed difference between the speed of vehicle 1 and the speed of a newly detected leading vehicle is within a set range (in other words, the same or substantially the same), travel control device 100 of this embodiment performs control to disable acceleration for reducing the inter-vehicle distance between vehicle 1 and the newly detected leading vehicle to the set inter-vehicle distance. This can suppress fuel consumption.

[Modifications]

The present disclosure is not limited to the above embodiment and can be suitably modified without departing from the spirit of the present disclosure. Individual modifications are described hereinbelow.

While the above embodiment has been described using an example in which leading-vehicle detection section 110 detects whether a leading vehicle is present on the basis of a forward image captured by camera 21, an example of detecting a leading vehicle is not limited thereto. For example, leading-vehicle detection section 110 may detect whether a leading vehicle is present on the basis of a signal from a laser radar or the like.

While the above embodiment has been described using an example in which speed determination section 120 calculates the speed difference between the speed of vehicle 1 and the speed of a newly detected leading vehicle, an example of obtaining the speed difference is not limited thereto. For example, the speed difference may be detected by speed/distance detection sensor 22, and speed determination section 120 may receive information indicating the speed difference from speed/distance detection sensor 22.

[Summary of Present Disclosure]

A travel control device according to the present disclosure is a travel control device that executes adaptive cruise control (ACC) for allowing a host vehicle to follow a leading vehicle and travel at a constant speed while keeping a preset inter-vehicle distance. The travel control device includes a leading vehicle detection section that, after the leading vehicle being followed at a speed equal to or lower than a preset vehicle speed has disappeared, determines whether a new leading vehicle has been detected in a predetermined time, a speed determination section that, when the new leading vehicle has been detected, determines whether the speed difference between the speed of the host vehicle and the speed of the new leading vehicle is within a set range based on zero, and a travel control section that, when the speed difference is within the set range, controls the host vehicle to disable acceleration for reducing an inter-vehicle distance between the host vehicle and the new leading vehicle to the preset inter-vehicle distance.

In the travel control device, when the speed difference is not within the set range, the speed determination section may further determine which of the speed of the host vehicle and the speed of the new leading vehicle is faster, and when the speed of the host vehicle is faster than the speed of the new leading vehicle, the travel control section may control the host vehicle to disable the acceleration.

In the travel control device, when the speed of the new leading vehicle is faster than the speed of the host vehicle, the speed determination section may further determine whether the speed of the new leading vehicle is equal to or lower than the preset vehicle speed, when the speed of the new leading vehicle is equal to or lower than the preset vehicle speed, the travel control section may execute the acceleration up to the preset vehicle speed at the maximum, and when the inter-vehicle distance between the host vehicle and the new leading vehicle reaches the preset inter-vehicle distance, the travel control section may control the host vehicle to follow the new leading vehicle and travel at a constant speed while keeping the preset inter-vehicle distance.

In the travel control device, when the speed of the new leading vehicle exceeds the preset vehicle speed, the travel control section may execute the acceleration up to the preset vehicle speed at the maximum, and when the speed of the host vehicle reaches the preset vehicle speed, the travel control section may control the host vehicle to travel while keeping the preset vehicle speed.

A vehicle according to the present disclosure includes the travel control device of the present disclosure.

A travel control method according to the present disclosure is a travel control method that executes adaptive cruise control (ACC) for allowing a host vehicle to follow a leading vehicle and travel at a constant speed while keeping a preset inter-vehicle distance. The travel control method includes, after the leading vehicle being followed at a speed equal to or lower than a preset vehicle speed has disappeared, determining whether a new leading vehicle has been detected in a predetermined time, when the new leading vehicle has been detected, determining whether the speed difference between the speed of the host vehicle and the speed of the new leading vehicle is within a set range based on zero, and when the speed difference is within the set range, controlling the host vehicle to disable acceleration for reducing an inter-vehicle distance between the host vehicle and the new leading vehicle to the preset inter-vehicle distance.

The disclosure of Japanese Patent Application No. 2017-215528, filed on Nov. 8, 2017, which is incorporated herein by reference in its entirety.

INDUSTRIAL APPLICABILITY

The travel control device, the vehicle, and the travel control method of the present disclosure are useful for vehicles that execute ACC.

REFERENCE SIGNS LIST

1 Vehicle
2 Automated traveling device
3 Engine
4 Clutch
5 Transmission
6 Propeller shaft
7 Differential gear
8 Drive shaft
9 Wheel
10 Engine ECU
11 Power transmission ECU
20 Vehicle speed sensor
21 Camera
22 Speed/distance detection sensor
40 Braking device
41 Foot brake
42 Retarder
43 Auxiliary brake
100 Travel control device
110 Leading-vehicle detection section
120 Speed determination section
130 Travel control section

What is claimed is:

1. A travel control device that executes adaptive cruise control (ACC) for allowing a host vehicle to follow a leading vehicle and travel at a constant speed while keeping a preset inter-vehicle distance, the travel control device comprising:

a leading vehicle detection section that, after the leading vehicle being followed at a speed equal to or lower than a preset vehicle speed has disappeared, determines whether a new leading vehicle traveling farther than the preset inter-vehicle distance has been detected in a predetermined time;

a speed determination section that, when the new leading vehicle has been detected, determines whether a speed difference between a speed of the host vehicle and a speed of the new leading vehicle is within a set range based on zero; and a travel control section that, when the speed difference is within the set range, controls the host vehicle to disable acceleration for reducing an inter-vehicle distance between the host vehicle and the new leading vehicle to the preset inter-vehicle distance.

2. The travel control device according to claim 1, wherein:

the speed determination section, when the speed difference is not within the set range, further determines which of the speed of the host vehicle and the speed of the new leading vehicle is faster; and the travel control section, when the speed of the host vehicle is faster than the speed of the new leading vehicle, controls the host vehicle to disable the acceleration.

3. The travel control device according to claim 2, wherein:

the speed determination section, when the speed of the new leading vehicle is faster than the speed of the host vehicle, further determines whether the speed of the new leading vehicle is equal to or lower than the preset vehicle speed; and the travel control section, when the speed of the new leading vehicle is equal to or lower than the preset vehicle speed, executes the acceleration up to the preset vehicle speed at the maximum, and the travel control section, when the inter-vehicle distance between the host vehicle and the new leading vehicle reaches the preset inter-vehicle distance, controls the host vehicle to follow the new leading vehicle and travel at a constant speed while keeping the preset inter-vehicle distance.

4. The travel control device according to claim 3, wherein the travel control section, when the speed of the new leading vehicle exceeds the preset vehicle speed, executes the acceleration up to the preset vehicle speed at the maximum, and the travel control section, when the speed of the host vehicle reaches the preset vehicle speed, controls the host vehicle to travel while keeping the preset vehicle speed.

5. A vehicle comprising the travel control device according to claim 1.

6. The travel control device according to claim 1, wherein:

when the speed difference is within the set range, the travel control section controls the host vehicle to travel while keeping a speed at which the host vehicle had followed the disappeared leading vehicle.

7. The travel control device according to claim 1, wherein:

when the new leading vehicle has not been detected by the leading vehicle detection section, the travel control section executes the acceleration up to the preset vehicle speed at the maximum; and after the speed of the host vehicle reaches the preset vehicle speed, the travel control section controls the host vehicle to travel while keeping the preset vehicle speed.

8. A travel control method that executes adaptive cruise control (ACC) for allowing a host vehicle to follow a leading vehicle and travel at a constant speed while keeping a preset inter-vehicle distance, the travel control method comprising:

determining, after the leading vehicle being followed at a speed equal to or lower than a preset vehicle speed has disappeared, whether a new leading vehicle traveling farther than the preset inter-vehicle distance has been detected in a predetermined time;

determining, when the new leading vehicle has been detected, whether a speed difference between a speed of the host vehicle and a speed of the new leading vehicle is within a set range based on zero; and controlling, when the speed difference is within the set range, the host vehicle to disable acceleration for reducing an inter-vehicle distance between the host vehicle and the new leading vehicle to the preset inter-vehicle distance.

* * * * *